UNITED STATES PATENT OFFICE.

JACOB G. MÜLLER, OF BUFFALO, NEW YORK.

IMPROVEMENT IN SALVES.

Specification forming part of Letters Patent No. 203,848, dated May 21, 1878; application filed March 19, 1878.

*To all whom it may concern:*

Be it known that I, JACOB GEO. MÜLLER, of Buffalo, in the county of Erie and State of New York, have invented a new and useful Compound, being a salve, which compound is fully described in the following specification.

This invention relates to salve compounds used for burns, cuts, bruises, sores, &c.; and it consists in a composition formed by mixing gum-arabic, spirits, tallow, and olive-oil.

To prepare this salve, say for a half-gallon, I take one-half ($\frac{1}{2}$) pound of gum-arabic, dissolve it in one pint of brandy, whisky, or spirits, as pure as may be, boil it, and into this put about one and one-half ($1\frac{1}{2}$) pound of beef or mutton tallow, and into all this add about one gill of olive-oil. Boil all until well mixed, then let it cool, and it is ready for use.

The employment of the gum-arabic is very important for burns, for which it is especially intended, or other wounds in which it is important to keep out the air, as its glutinous properties make it stick well, and at the same time cover the hurt with a film, excluding the air.

The spirit, also combined with it, makes it valuable for sores, burns, frozen feet or hands, &c., and aids in taking out the inflammation.

The tallow and olive-oil have both been long used for similar purposes.

I believe my combination makes a compound that is new.

I claim—

The compound for salve consisting of gum-arabic dissolved in brandy, whisky, or other spirits, with beef or mutton tallow and olive-oil added, all in about the proportions herein described, and for the purpose set forth.

In witness whereof I have hereunto signed my name in the presence of two subscribing witnesses.

JACOB G. MÜLLER.

Witnesses:
  J. R. DRAKE,
  T. H. PARSONS.